United States Patent
Chalgren et al.

(10) Patent No.: US 7,454,896 B2
(45) Date of Patent: Nov. 25, 2008

(54) THERMAL MANAGEMENT SYSTEM FOR A VEHICLE

(75) Inventors: Robert D. Chalgren, Marquette, MI (US); Michael P. Lasecki, Gladstone, MI (US); Michael W. Martin, Gladstone, MI (US); Thomas J. Hollis, Medford, NJ (US); Mark S. Bader, Gladstone, MI (US); David J. Allen, Gladstone, MI (US)

(73) Assignee: EMP Advanced Development, LLC, Escanaba, MI (US)

(*) Notice: Subject to any disclaimer, the term of this patent is extended or adjusted under 35 U.S.C. 154(b) by 387 days.

(21) Appl. No.: 11/063,686

(22) Filed: Feb. 23, 2005

(65) Prior Publication Data

US 2006/0185364 A1 Aug. 24, 2006

(51) Int. Cl.
*F02M 25/06* (2006.01)
(52) U.S. Cl. .......................... 60/278; 60/599
(58) Field of Classification Search ................ 60/278, 60/599
See application file for complete search history.

(56) References Cited

U.S. PATENT DOCUMENTS

| | | | |
|---|---|---|---|
| 3,232,044 A | 2/1966 | Gratzmuller | |
| 3,397,684 A | 8/1968 | Scherenberg | |
| 3,444,845 A | 5/1969 | Scheiterlein | |
| 3,797,562 A | 3/1974 | Brille et al. | |
| 3,934,644 A | 1/1976 | Johnston | |
| 4,077,219 A | 3/1978 | Melchior et al. | |
| 4,236,492 A * | 12/1980 | Tholen | 123/563 |
| 4,317,439 A * | 3/1982 | Emmerling | 123/563 |
| 4,977,743 A | 12/1990 | Aihara et al. | |
| 5,036,803 A | 8/1991 | Nolting et al. | |
| 5,215,044 A | 6/1993 | Banzhaf et al. | |
| 5,440,880 A | 8/1995 | Ceynow et al. | |
| 5,607,010 A * | 3/1997 | Schonfeld et al. | 165/51 |
| 5,611,202 A | 3/1997 | Sumser et al. | |
| 5,732,688 A | 3/1998 | Charlton et al. | |
| 5,802,846 A * | 9/1998 | Bailey | 60/278 |
| 5,806,308 A * | 9/1998 | Khair et al. | 60/278 |
| 5,927,075 A * | 7/1999 | Khair | 60/605.2 |

(Continued)

OTHER PUBLICATIONS

Robert D. Chalgren Jr. et al.; "A Controllable Water Cooled Charge Air Cooler (WCCAC) for Diesel Trucks"; 2004-01-2614; 2004 SAE International; 8 pages.

(Continued)

*Primary Examiner*—Thomas Denion
*Assistant Examiner*—Loren Edwards
(74) *Attorney, Agent, or Firm*—Brooks Kushman P.C.

(57) ABSTRACT

A vehicle thermal management system includes an exhaust gas cooler configured to receive exhaust gas from the engine and to cool the exhaust gas before it is recirculated back into the engine. A valve is located downstream from the exhaust gas cooler, and is operable to control the amount of exhaust gas passing through the exhaust gas cooler. Intake air mixes with the exhaust gas downstream from the first valve. The mixed gas is then cooled by a mixed gas cooler before it enters the engine intake manifold. A coolant is circulated through the mixed gas cooler and a heat exchanger. The mixed gas rejects heat to the coolant via the mixed gas cooler, and the coolant rejects heat to the ambient air via the heat exchanger.

20 Claims, 6 Drawing Sheets

U.S. PATENT DOCUMENTS

| | | | |
|---|---|---|---|
| 6,062,026 A * | 5/2000 | Woollenweber et al. | 60/605.2 |
| 6,098,576 A | 8/2000 | Nowak, Jr. et al. | |
| 6,152,118 A * | 11/2000 | Sasaki et al. | 123/568.21 |
| 6,185,939 B1 * | 2/2001 | Coleman et al. | 60/605.2 |
| 6,205,775 B1 * | 3/2001 | Coleman et al. | 60/278 |
| 6,244,256 B1 * | 6/2001 | Wall et al. | 123/568.12 |
| 6,321,697 B1 | 11/2001 | Matsuda et al. | |
| 6,338,245 B1 * | 1/2002 | Shimoda et al. | 60/285 |
| 6,357,541 B1 | 3/2002 | Matsuda et al. | |
| 6,422,309 B2 | 7/2002 | Vincent | |
| 6,427,436 B1 * | 8/2002 | Allansson et al. | 60/274 |
| 6,470,682 B2 * | 10/2002 | Gray, Jr. | 60/605.2 |
| 6,604,515 B2 * | 8/2003 | Marsh et al. | 123/563 |
| 6,772,715 B2 | 8/2004 | Pfeffinger et al. | |
| 6,786,210 B2 * | 9/2004 | Kennedy et al. | 123/568.12 |
| 6,789,512 B2 | 9/2004 | Duvinage et al. | |
| 6,807,955 B2 * | 10/2004 | Leedham et al. | 123/568.12 |
| 6,834,645 B2 | 12/2004 | Takizawa et al. | |
| 6,836,710 B2 | 12/2004 | Yamaki | |
| 6,978,772 B1 * | 12/2005 | Dorn et al. | 123/568.12 |
| 7,000,685 B2 * | 2/2006 | Morishita et al. | 165/80.4 |
| 7,040,303 B2 * | 5/2006 | Uzkan et al. | 123/563 |
| 7,189,374 B1 * | 3/2007 | Hawker | 422/168 |
| 7,219,661 B2 * | 5/2007 | Aberle | 123/568.12 |
| 2002/0174840 A1 | 11/2002 | Luckner et al. | |
| 2003/0056772 A1 * | 3/2003 | Borrmann et al. | 123/563 |
| 2003/0150406 A1 | 8/2003 | Takagi et al. | |
| 2004/0244782 A1 | 12/2004 | Lewallen | |
| 2006/0185626 A1 | 8/2006 | Allen et al. | |

OTHER PUBLICATIONS

Robert D. Chalgren Jr. et al.; "Development and Verification of a Heavy Duty 42/14V Electric Powertrain Cooling System"; 2003-01-3416; 2003 SAE International; 9 pages.

Robert D. Chalgren et al.; "A Controlled EGR Cooling System for Heavy Duty Diesel Applications Using the Vehicle Engine Cooling System Simulation"; 2002-01-0076; 2002 Society of Automotive Engineers; Inc.; pp. 1-26.

Robert D. Chalgren Jr. et al.; "Thermal Comfort and Engine Warm-up Optimization of a Low-Flow Advanced Thermal Management System"; 2004-01-0047; 2004 SAE International; 7 pages.

David J. Allen, et al.; "Thermal Management Evolution and Controlled Coolant Flow"; 2001-01-1732; 2001 Society of Automotive Engineers, Inc.; pp. 1-18.

* cited by examiner

THERMAL MANAGEMENT SYSTEM FOR A VEHICLE

BACKGROUND OF THE INVENTION

1. Field of the Invention

The present invention relates to a thermal management system for a vehicle.

2. Background Art

In response to demands for improved fuel economy and reduced emissions, vehicles today are being manufactured with systems designed to increase combustion efficiency and reduce exhaust emissions. One way to reduce exhaust emissions, particularly in diesel engines, is to introduce some of the engine exhaust gas back into the combustion cylinders to lower the temperature of combustion. These systems, known as exhaust gas recirculation (EGR) systems can be particularly useful in reducing emissions of nitrogen-oxygen compounds, known collectively as $NO_x$.

A number of EGR systems are described in a Society of Automotive Engineers (SAE) Technical Paper, Document Number 2001-01-1732, entitled "Thermal Management Evolution and Controlled Coolant Flow," copyright 2001. One such system includes a controllable electric pump for circulating engine coolant through an EGR cooler. The electric pump can replace a larger, mechanical pump, thereby providing an overall space savings. Another system described in the SAE paper includes a separate EGR cooling loop having its own coolant loop separate from the engine coolant loop. The EGR cooling loop includes a controllable electric pump, and its own liquid-to-air heat exchanger for dissipating heat from the EGR coolant.

Although EGR systems used on vehicles today may be helpful to reduce the temperature of combustion in the engine cylinders, they may not provide a high degree of control over the temperature of the combustion. In addition, passing hot exhaust gas through control valves, such as an EGR valve, can be damaging to the valve. Therefore, it would be desirable to provide a thermal management system for a vehicle that included exhaust gas recirculation and provided a high degree of control over the temperature of the air entering the engine cylinders, thereby controlling the temperature of combustion to reduce exhaust emissions.

SUMMARY OF THE INVENTION

Accordingly, one aspect of the present invention includes a vehicle thermal management system operable to maintain the temperature of combustion within the engine at or near a target temperature, thereby providing increased combustion efficiency, and reducing exhaust emissions.

Another aspect of the invention provides an exhaust gas recirculation system that cools the exhaust gas prior to entry into an EGR valve, thereby extending the life of the valve.

The invention further provides a thermal management system for a vehicle including an engine. The system includes an exhaust gas cooler configured to receive exhaust gas from the engine and to cool the exhaust gas as it passes through it. A first valve is located downstream from the exhaust gas cooler, and is operable to control the amount of exhaust gas passing through the exhaust gas cooler. An air intake system receives intake air for the engine. It includes a compressor operable to compress the intake air, and is configured to deliver the compressed intake air downstream from the first valve. This forms a mixed gas including the compressed intake air and the exhaust gas. A mixed gas cooler is located downstream from the first valve for cooling the mixed gas as it passes through the mixed gas cooler. A first pump is operable to pump a first coolant through the mixed gas cooler, thereby facilitating heat transfer from the mixed gas to the first coolant. A first heat exchanger is in fluid communication with the mixed gas cooler for transferring heat from the first coolant to the ambient air.

The invention also provides a thermal management system for a vehicle including an engine. An exhaust cooler is configured to receive exhaust gas from the engine and to cool the exhaust gas as it passes through it. A first valve is operable to control the amount of exhaust gas passing through the exhaust gas cooler. An air intake system receives intake air for the engine. The intake system includes a compressor operable to compress the intake air. The intake system is configured to deliver the compressed intake air downstream from the first valve, thereby forming a mixed gas including the compressed intake air and the exhaust gas. A mixed gas cooler is located downstream from the first valve for cooling the mixed gas as it passes through the mixed gas cooler. A first heat exchanger is in fluid communication with the mixed gas cooler for transferring heat from the coolant to the ambient air. A pump is operable to pump a coolant through the mixed gas cooler and the exhaust gas cooler, thereby facilitating respective heat transfer from the mixed gas and the exhaust gas to the first coolant.

The invention further provides a thermal management system for a vehicle including an engine. The system includes an exhaust gas cooler configured to receive exhaust gas from the engine, and to cool the exhaust gas as it passes through it. A first valve is downstream from the exhaust gas cooler, and is operable to control the amount of exhaust gas passing through the exhaust gas cooler. An air intake system receives intake air for the engine, and is configured to deliver the intake air downstream from the first valve. This forms a mixed gas including the intake air and the exhaust gas. A first mixed gas cooler is located downstream from the first valve for cooling the mixed gas as it passes through the first mixed gas cooler. A bypass line having an inlet upstream from the first mixed gas cooler, and an outlet downstream from the first mixed gas cooler, facilitates flow of the mixed gas around the first mixed gas cooler. A second valve is operable to control the amount of mixed gas flowing through the bypass line.

DETAILED DESCRIPTION OF THE PREFERRED EMBODIMENT(S)

Figure 1:
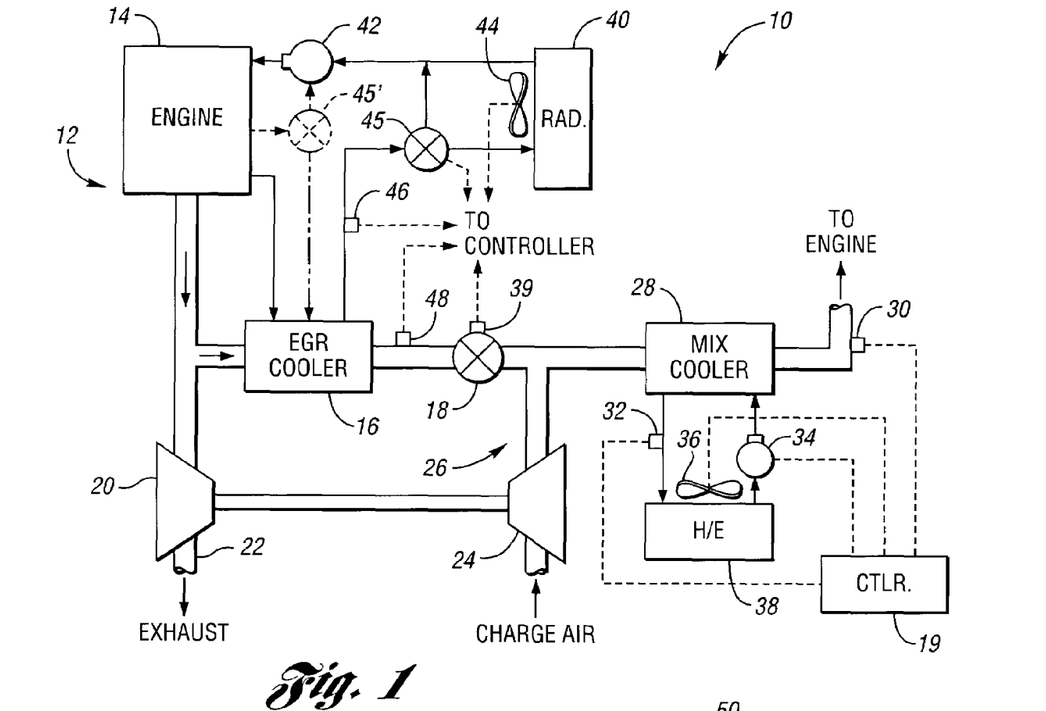
FIG. 1 is a schematic representation of a vehicle thermal management system in accordance with the present invention.

FIG. 1 shows a vehicle thermal management system 10 in accordance with the present invention. Also shown in FIG. 1 is a portion of a vehicle 12, including an engine 14. The thermal management system 10 includes an exhaust gas cooler, or EGR cooler 16. As explained more fully below, the EGR cooler 16 cools the exhaust gas before it is recirculated back into the engine 14. An EGR valve 18 is located downstream from the EGR cooler 16, and is operable to control the amount of exhaust gas passing through the EGR cooler 16. By placing the EGR valve 18 downstream from the EGR cooler 16, the exhaust gas is cooled when it reaches the EGR valve 18. This helps to avoid some of the deleterious effects that hot exhaust gas can have on a valve, thus helping to extend the life of the EGR valve 18.

Having the exhaust gas cooled prior to entering the EGR valve 18 also allows the use of a smaller valve. This is because the mass of the exhaust gas is greater after it has been cooled; with a higher mass of exhaust gas, less flow is required, and hence, a smaller valve. Of course, the present invention contemplates the use of an EGR valve upstream from an exhaust gas cooler. This may be beneficial in some situations, particularly when it is desired to avoid condensation of the exhaust gas in the EGR valve. As shown by the dashed line leaving the EGR valve 18, the EGR valve 18 is in communication with, and controlled by, a control system, simply designated in FIG. 1 as a controller 19.

That portion of the exhaust gas that does not go through EGR cooler 16 is used to drive a turbine 20, and is then exhausted through an exhaust pipe 22. The turbine 20 is operable to rotate a compressor 24, which is part of an air intake system 26. The compressor 24 is operable to compress the intake air, designated in FIG. 1 as "charge air". Upon leaving the compressor 24, the compressed intake air mixes with the exhaust gas leaving the EGR valve 18. Because the EGR cooler 16 is upstream from the connection with the air intake system 26, it can be operated to cool the exhaust gas to a temperature that approximately matches the temperature of the compressed intake air, for example, 200°-260° C.

A mixed gas cooler 28 is located downstream from the EGR valve 18, and is used to cool the mixed gas—i.e., the exhaust gas and the compressed intake air. Use of the mixed gas cooler 28 facilitates heat transfer between the mixed gas and a first coolant that circulates through the mixed gas cooler 28. The mixed gas cooler 28 can be controlled such that the temperature of the gas leaving the mixed gas cooler 28, which is the air that will enter the engine 14, is at or near a temperature that is optimum for combustion. A temperature sensor 30 senses the temperature of the air entering the intake manifold of the engine 14, and sends a signal related to the sensed temperature to the controller 19. As noted above, the controller 19 is in communication with the EGR valve 18, and it also receives additional inputs, and operates other system components as well.

In order to maintain the temperature of the air entering the engine 14 at or near a temperature that is optimum for combustion, for example 55° C., the amount and temperature of the coolant flowing through the mixed gas cooler 28 is controlled. A temperature sensor 32 senses the temperature of the coolant as it leaves the mixed gas cooler 28, and sends a signal to the controller 19 related to the sensed temperature. Based on the various inputs received, the controller 19 operates a pump 34 and a fan 36 to help control the temperature of the air entering the engine 14. It is worth noting that in the embodiment shown in FIG. 1, as with the other embodiments described herein, more than one fan can be used for a single heat exchanger. This may be particularly useful in commercial vehicles where large heat exchangers are found. In order to reduce the temperature of the coolant flowing through the mixed gas cooler 28, a heat exchanger 38 is used to transfer heat from the coolant to the ambient air. The fan 36 is operable to move ambient air across the heat exchanger 38; this may be particularly important for vehicles that operate at very low speeds, such as construction vehicles.

Although it is shown in FIG. 1 as a single hardware device, the controller 19 can consist of multiple hardware controllers, software controllers, or some combination thereof. In addition, the controller 19 can be configured with a control structure for optimizing the speed of the pump 34 and the fan 36 based on one or more inputs it receives. For example, the controller 19 may use an input or inputs from the temperature sensor 32 to optimize the pump and fan speeds. Alternatively, the controller 19 may use an input or inputs from a mass flow sensor 39 at the EGR valve 18. Signals from the flow sensor 39 may be directly input into the controller 19, or they may be sent to an engine control unit (not shown), which then communicates the signal information to the controller 19.

The control structure may be programmed into the controller 19 in the form of operation data which provide a maximized heat transfer between the coolant and the ambient air via the heat exchanger 38, for a minimized power input into the pump 34 and the fan 36. The use of operation data to optimize operation of a fan and a pump to effect efficient heat transfer through a heat exchanger is described in U.S. Pat. No. 7,267,086, issued on 11 Sep. 2007 entitled "Thermal Management System And Method For A Heat Producing System", and which is incorporated herein by reference. By controlling various system components, the controller 19 is able to maintain the temperature of the air entering the engine 14 within a predetermined temperature range, which includes the desired target temperature.

Engine coolant circulates through the EGR cooler 16 to facilitate heat transfer from the hot exhaust gas to the engine coolant. The hot coolant, leaving the EGR cooler 16 then passes through a radiator 40 before being returned to the engine 14 via a pump 42. When the engine coolant passes through the radiator 40, heat is transferred from the engine coolant to the ambient air. An electric fan 44 is controlled by the controller 19 to facilitate airflow across the radiator 40. This promotes an increase in heat transfer from the engine coolant to the ambient air. As shown in FIG. 1, the pump 42 is a mechanical component, driven by the engine 14. Alternatively, the pump 42 could be electric, and controlled by the controller 19. The choice of which type of pump to use may depend on a number of considerations, such as whether a high voltage source is available in the vehicle 12.

A valve 45, which could be a thermostatic or electrically controlled valve, facilitates bypassing the radiator 40, which may be beneficial in cold temperatures, particularly right after engine startup. Alternatively, a valve, such as the valve 45, could be located between the engine 14 and the EGR cooler 16. Such a valve 45' is shown in phantom in FIG. 1. The use of either valve 45, 45' would allow the coolant to bypass the radiator 40, which can be beneficial upon initial startup and in cold weather conditions.

A temperature sensor 46 senses the temperature of the engine coolant after it leaves the EGR cooler 16. The sensor 46 is in communication with the cooler 19, thereby providing the controller 19 with information regarding the heat transfer in the EGR cooler 16. Another temperature sensor 48 measures the temperature of the exhaust gas leaving the EGR cooler 16; the sensor 48 also sends a signal to the controller 19. These inputs can help the controller 19 to control the various components of the thermal management system 10, including the pump 42 and the fan 44, when these components are electric. In this way, the controller 19 can help to maintain the temperature of the air entering the engine 14 at or near an optimum temperature, thereby increasing combustion efficiency and reducing exhaust emissions.

Figure 2:
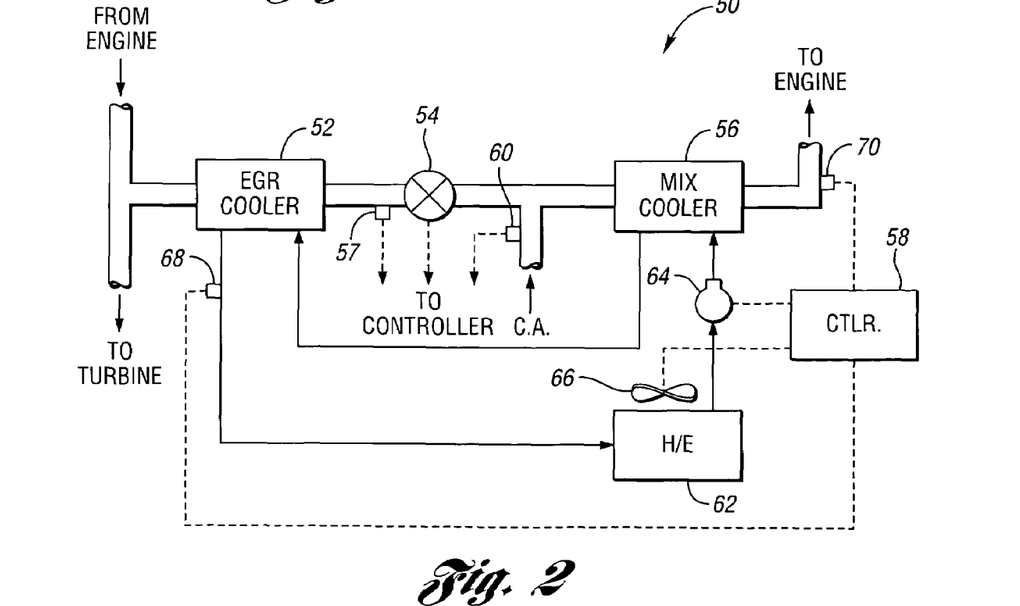
FIG. 2 is a schematic representation of a second vehicle thermal management system in accordance with the present invention.

FIG. 2 shows another vehicle thermal management system 50 in accordance with the present invention. The thermal management system 50 includes an EGR cooler 52, and EGR valve 54 downstream from the EGR cooler 52. The thermal management system 50 also includes a mixed gas cooler 56, which receives exhaust gas as it leaves the EGR cooler 52 and receives the charge air (C.A.) after it is compressed. As in the embodiment shown in FIG. 1, the EGR valve 54 and a temperature sensor 57 are in communication with a control system, shown as a controller 58. In addition to the temperature sensor 57, which measures the temperature of the exhaust gas leaving the EGR cooler 52, a temperature sensor 60 is used to sense the temperature of the charge air before it mixes with the exhaust gas. The sensor 60 is also in communication with the controller 58, and provides a signal to the controller 58 related to the temperature of the charge air. The use of the temperature sensor 60 is optional, but it may provide greater control over the temperature of the air entering the engine cylinders, and thus, may help to ensure greater combustion efficiency and reduced exhaust emissions.

The thermal management system 50, shown in FIG. 2, uses a single cooling loop for both the EGR cooler 52 and the mixed gas cooler 56. A single heat exchanger 62 facilitates heat transfer between the coolant and the ambient air. The controller 58 controls operation of a pump 64 and a fan 66, which helps to control the temperature of the fluid circulating through the EGR cooler 52 and the mixed gas cooler 56. The temperature of the coolant is sensed by a temperature sensor 68, which is in communication with the controller 58. Utilizing the various inputs, the controller 58 can control the pump 64 and the fan 66 to maintain the temperature of the air entering the engine (not shown), which is sensed by a temperature sensor 70. Separating the EGR cooler 52 from the engine coolant loop may provide greater control over the temperature of the exhaust gas passing through the EGR cooler 52, particularly when the engine coolant loop includes a mechanical pump and a mechanical fan, such as shown in FIG. 1. Like the thermal management system 10, shown in FIG. 1, the controller 58 in the thermal management system 50 may include a control structure to optimize the speed of operation of the pump 64 and the fan 66. To further assist the controller 58 in the optimized operation of the pump 64 and the fan 66, each of these components may be equipped with a speed sensor to provide feedback to the controller 58.

Figure 3:
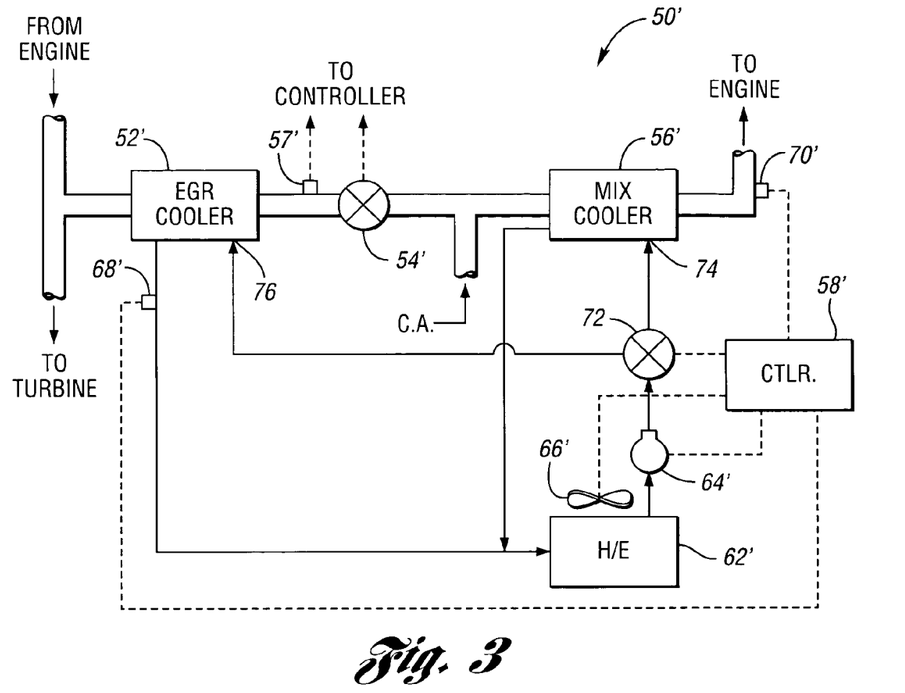
FIG. 3 is a schematic representation of a third vehicle thermal management system in accordance with the present invention.

FIG. 3 shows a variation of the vehicle thermal management system 50, shown in FIG. 2. To facilitate description, the system shown in FIG. 3 will include numerical labels having the prime symbol for components that are similar to components shown in FIG. 2. Thus, FIG. 3 shows a vehicle thermal management system 50' that includes an EGR cooler 52', an EGR valve 54', and a mixed gas cooler 56'. Also shown in FIG. 3, temperature sensors 57', 68', and 70' all provide inputs to a controller 58'. As with the vehicle thermal management system 50, shown in FIG. 2, the vehicle thermal management system 50' includes a single heat exchanger 62' which facilitates heat transfer between a circulated coolant and the ambient air. The coolant is circulated by a pump 64' which is controlled by the controller 58'. Similarly, a fan 66' is controlled by the controller 58', and is used to facilitate airflow across the heat exchanger 62'.

One difference between the thermal management system 50, shown in FIG. 2, and the thermal management system 50', shown in FIG. 3, is that the latter includes a valve 72 which is disposed between the pump 64' and an inlet 74 of a mixed gas cooler 56'. The valve 72 is controlled by the controller 58', and it is operable to direct at least some of the coolant to the inlet 74 of the mixed gas cooler 56'. The valve 72 is also operable to direct at least some of the coolant to an inlet 76 of the EGR cooler 52'. Such an arrangement may provide greater control over the temperature of the gases at various points in the thermal management system 50'. Thus, controlling the operation of the pump 64' and the valve 72 can allow the coolant flow through the EGR cooler 52', or the mixed gas cooler 56', to be increased or decreased, without affecting the coolant flow through the other.

Figure 4:
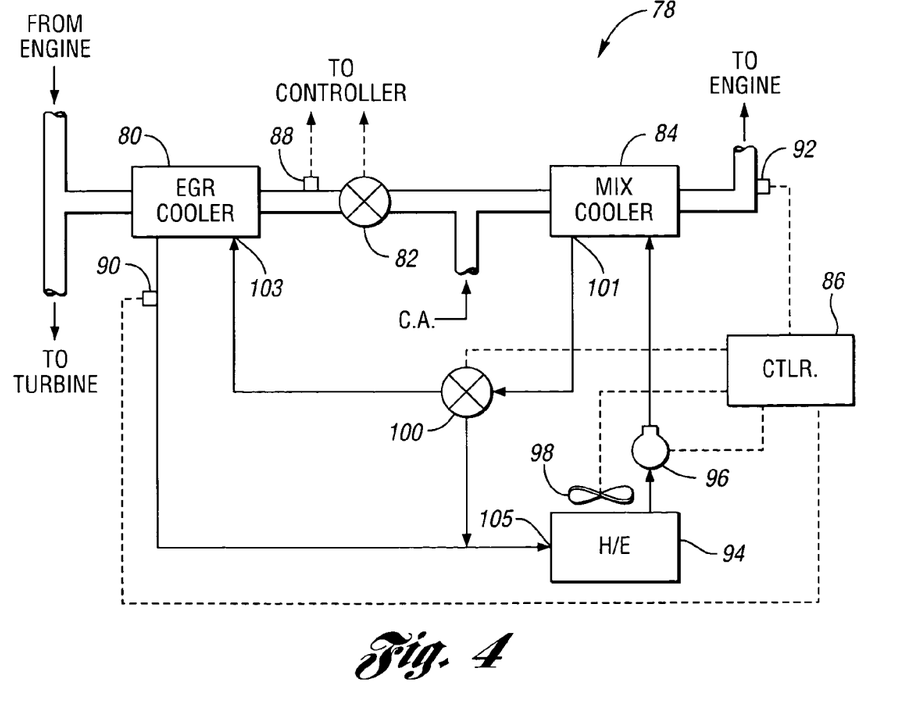
FIG. 4 is a schematic representation of a fourth vehicle thermal management system in accordance with the present invention.

FIG. 4 shows another vehicle thermal management system 78 in accordance with the present invention. The thermal management system 78 includes an EGR cooler 80, an EGR valve 82, downstream from the EGR cooler 80, and a mixed gas cooler 84. The EGR valve 82 is in communication with, and controlled by, a control system, represented by a controller 86. A temperature sensor 88 senses the temperature of the exhaust gas leaving the EGR cooler 80, and sends a signal to the controller 86 related to the sensed temperature. Similarly, a temperature sensor 90 senses the temperature of coolant leaving the EGR cooler 80 and sends a signal to the controller 86. As with the other embodiments, a temperature sensor 92 senses the temperature of the intake air just before it enters the engine (not shown). It is worth noting that a temperature sensor, such as the temperature sensor 92, which is used to measure the temperature of the air just prior to its entering the engine, will often be located within an engine air intake manifold. Similar to the embodiments shown in FIGS. 2 and 3, the thermal management system 78 includes a single heat exchanger 94 which is used to transfer heat between the coolant and the ambient air. A pump 96 and a fan 98 are controlled by the controller 86, and are used to help control the temperature of the coolant, which in turn helps to control the temperature of the air entering the engine.

The thermal management system 78 includes a valve 100 disposed between an outlet 101 of the mixed gas cooler 84 and an inlet 103 of the EGR cooler 80. The valve 100 allows some or all of the coolant to bypass the EGR cooler 80, by directing coolant to an inlet 105 of the heat exchanger 94. Bypassing the EGR cooler 80 may be desirable when the ambient air temperature is very cold, and the exhaust gas requires very little cooling prior to mixing with the charge air. In these situations, the pump 96 can be operated at a minimum speed to inhibit the amount of cooling of the exhaust gas and the charge air prior to entering the engine. Thus, the thermal management system 78, shown in FIG. 4, provides a high degree of control over the temperature of the air entering the engine, even in very cold conditions.

Figure 5:
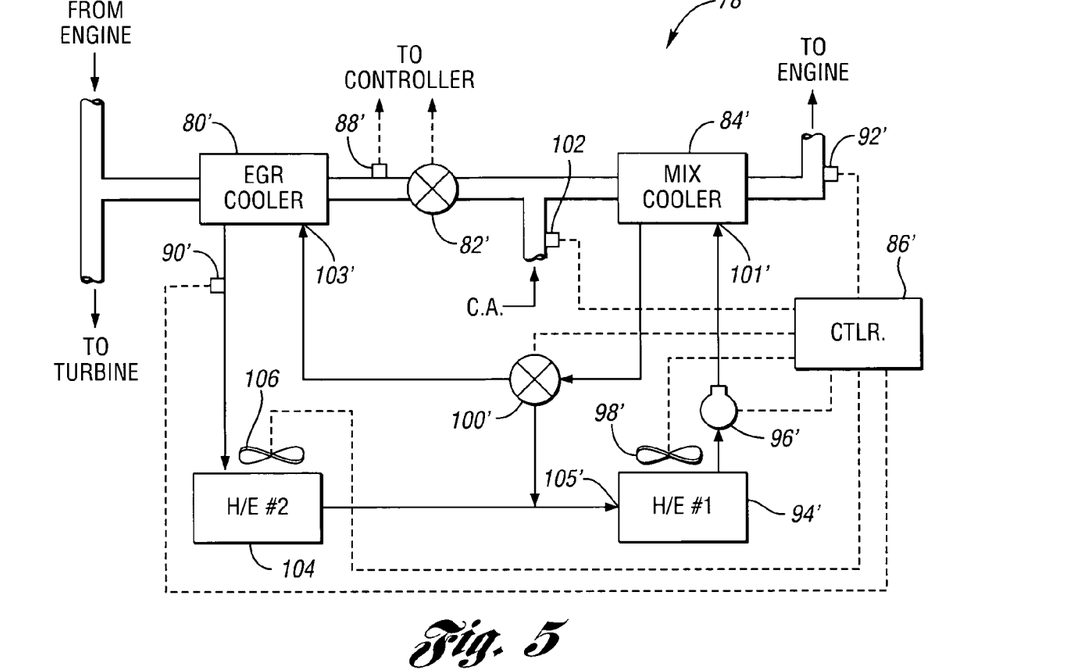
FIG. 5 is a schematic representation of a fifth vehicle thermal management system in accordance with the present invention.

FIG. 5 shows a schematic representation of a variation of the vehicle thermal management system shown in FIG. 4. The prime symbol is again used to designate like components. The vehicle thermal management system 78', shown in FIG. 5, includes an EGR cooler 80' with an inlet 103', an EGR valve 82', and a mixed gas cooler 84' with an outlet 101'. The EGR valve 82' is operated by a controller 86'. Temperature sensors 88', 90', and 92' all provide inputs to the controller 86'. In addition, an optional temperature sensor 102 is provided to sense the temperature of the charge air after it leaves the compressor (not shown).

The thermal management system 78' also includes a valve 100' that is controlled by the controller 86', and that is operable to allow some or all of the coolant to bypass the EGR cooler 80'. All of the coolant circulating in the system will pass through a first heat exchanger 94', having an inlet 105', while a pump 96' is used to circulate the fluid. A fan 98', also controlled by the controller 86', is operable to facilitate airflow across the first heat exchanger 94'. Unlike the embodiment shown in FIG. 4, the thermal management system 78' includes a second heat exchanger 104 which, in the embodiment shown in FIG. 5, has a separate fan 106. The fan 106 is operable to facilitate airflow across the second heat exchanger 104. It is worth noting that the heat exchangers 94', 104 could be side-by-side, and even integrated into a single housing. This would allow a single fan to be used for both heat exchangers. The addition of the second heat exchanger 104 provides additional cooling which may be beneficial in very hot conditions. Thus, the vehicle thermal management system 78' provides additional control over the temperature of the intake air entering the engine. In this way, the temperature of the intake air can be controlled to provide efficient combustion and to reduce exhaust emissions even in very hot conditions.

Figure 5A:
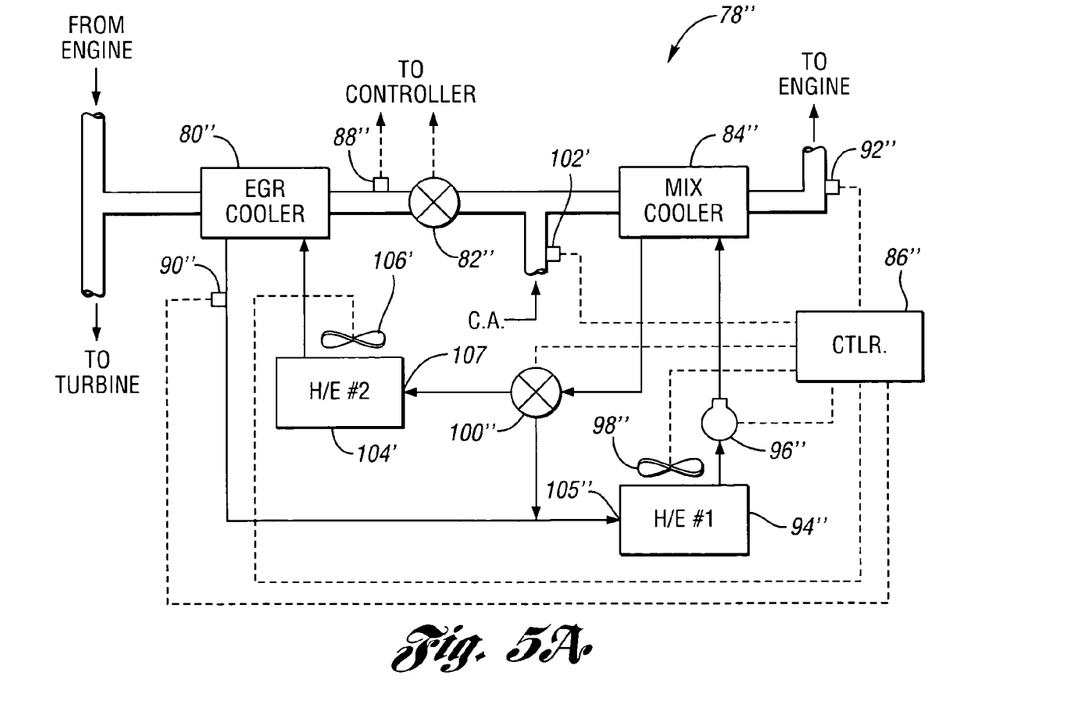
FIG. 5A is a schematic representation of a sixth vehicle thermal management system in accordance with the present invention.

FIG. 5A shows a thermal management system 78", which is similar to the thermal management system 78' shown in FIG. 5. Like elements are denoted with the prime and double prime symbols as appropriate. In the thermal management system 78", the valve 100" is located between the mixed gas cooler 84" and the second heat exchanger 104'. Thus, the valve 100" is operable to direct some or all of the coolant to the inlet 105" of the first heat exchanger 94", or the inlet 107 of the second heat exchanger 104'. The placement of the second heat exchanger 104' allows the EGR cooler to facilitate greater heat rejection from the exhaust gases passing therethrough. This may be particularly beneficial in hot ambient and/or high engine load conditions. Such an arrangement may also allow a greater flow of exhaust gas through the EGR cooler 80".

Figure 6:
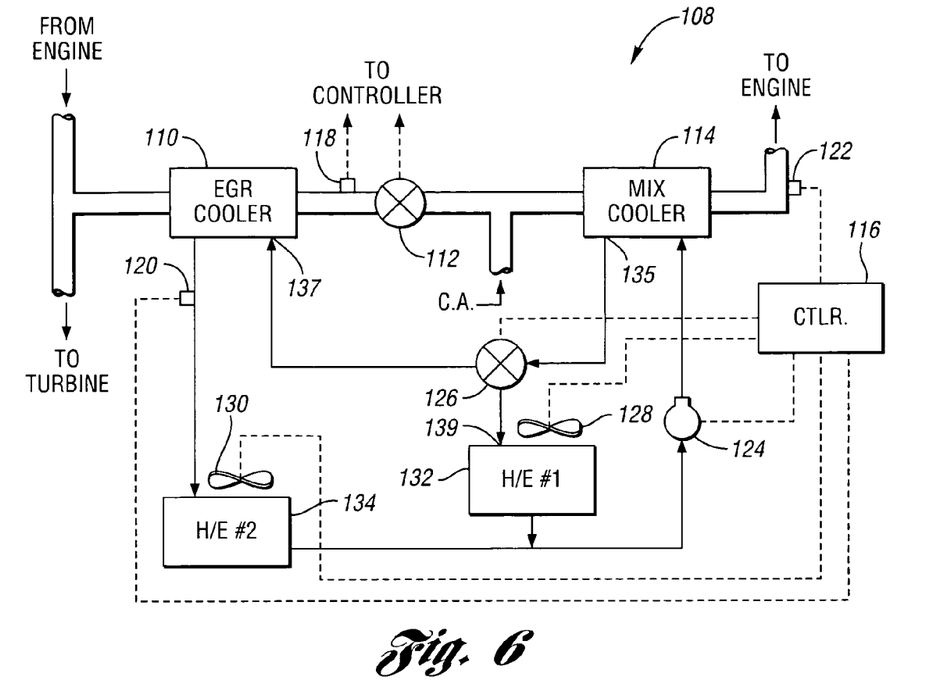
FIG. 6 is a schematic representation of a seventh vehicle thermal management system in accordance with the present invention.

FIG. 6 shows another vehicle thermal management system 108 in accordance with the present invention. The thermal management system 108 includes an EGR cooler 110, an EGR valve 112, and a mixed gas cooler 114. The EGR valve 112 is controlled by a control system, shown as controller 116. Temperature sensors 118, 120, and 122 provide inputs to the controller 116. A pump 124, a valve 126, and fans 128, 130 are also controlled by the controller 116. It is worth noting that the controller 116, like any of the controllers in accordance with the present invention, can include a control structure for optimizing the speed of the pump and the fans, thereby providing a maximum amount heat rejection for a minimum amount of power input.

The thermal management system 108 also includes first and second heat exchangers 132, 134. Unlike the embodiment shown in FIG. 5, the heat exchangers 132, 134 are located in separate cooling loops. For example, all of the coolant leaving an outlet 135 of the mixed gas cooler 114 can be directed by the valve 126 into an inlet 137 of the EGR cooler 110. In such a situation, all of the coolant then passes through the second heat exchanger 134, before being pumped back into the mixed gas cooler 114. This resembles the configuration shown in FIG. 2. Alternatively, all of the coolant leaving the mixed gas cooler 114 can be directed by the valve 126 into an inlet 139 of the first heat exchanger 132, so that the EGR cooler 110 is completely bypassed. Finally, the valve 126 can direct some of the coolant leaving the mixed gas cooler 114 to pass through the first heat exchanger 132, while another portion of the coolant is directed through the EGR cooler 110. Thus, the vehicle thermal management system 108 provides individualized heat exchanger control such that the temperature of the air entering the engine (not shown) is controlled within a very tight range around the desired target temperature.

Figure 7:
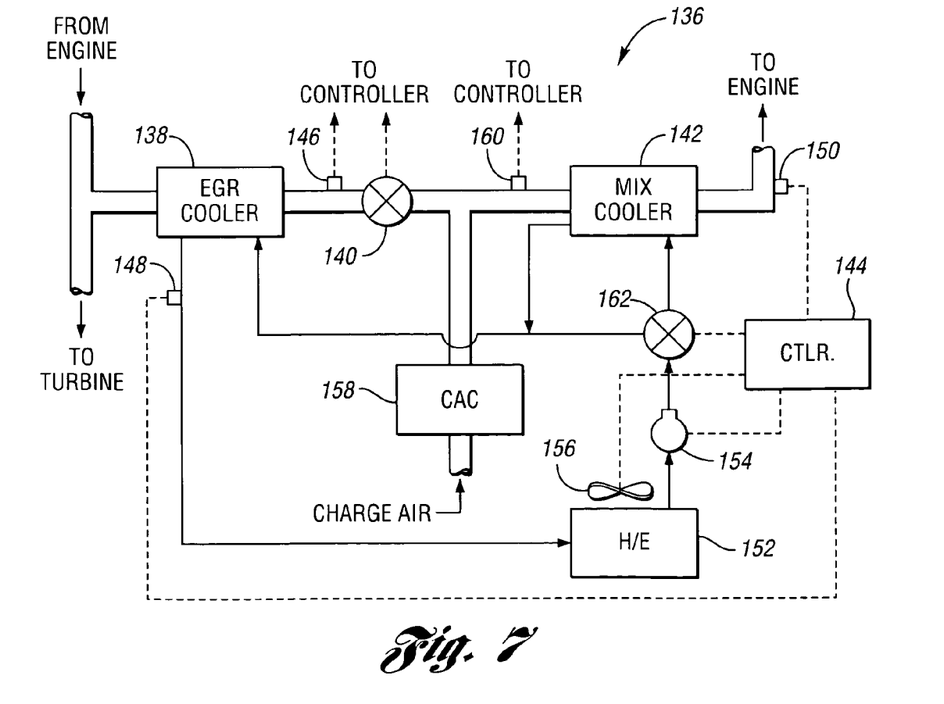
FIG. 7 is a schematic representation of an eighth vehicle thermal management system in accordance with the present invention.

FIG. 7 shows another vehicle management system 136 in accordance with the present invention. The thermal management system 136 includes an EGR cooler 138, an EGR valve 140, and a mixed gas cooler 142. The EGR valve 140 is controller by a control system, shown as controller 144. Temperature sensors 146, 148, and 150 provide inputs to the controller 144. The temperature of the coolant is measured at sensor 148, which allows for control of the temperature of the exhaust gas passing through the EGR cooler 138. Thus, the sensor 146, which measures the temperature of the exhaust gas after it passes through the EGR cooler 138, is optional. A heat exchanger 152 facilitates heat transfer between the coolant and the ambient air. A pump 154, controlled by the controller 144, is operable to pump the coolant through the system. A fan 156, also controlled by the controller 144, is operable to facilitate airflow across the heat exchanger 152.

The thermal management system 136 also includes a small charge air cooler 158. The charge air cooler 158 is an air-to-air cooler that cools the intake air after it leaves the compressor (not shown), but prior to the air mixing with the exhaust gas. In this way, most or all of the necessary cooling for the charge air can take place prior to reaching the mixed gas cooler 142. This arrangement may be particularly beneficial for high loads and/or hot driving conditions. To determine the temperature of the mixed gas, prior to entering the mixed gas cooler 142, a temperature sensor 160 is provided. A valve 162, controlled by the controller 144, allows some or all of the coolant to bypass the mixed gas cooler 142. Thus, the addition of the charge air cooler 158 may limit the amount of coolant that is necessary to pump through the mixed gas cooler 142. This may reduce the load on the pump, thereby resulting in an overall power savings.

Figure 8:
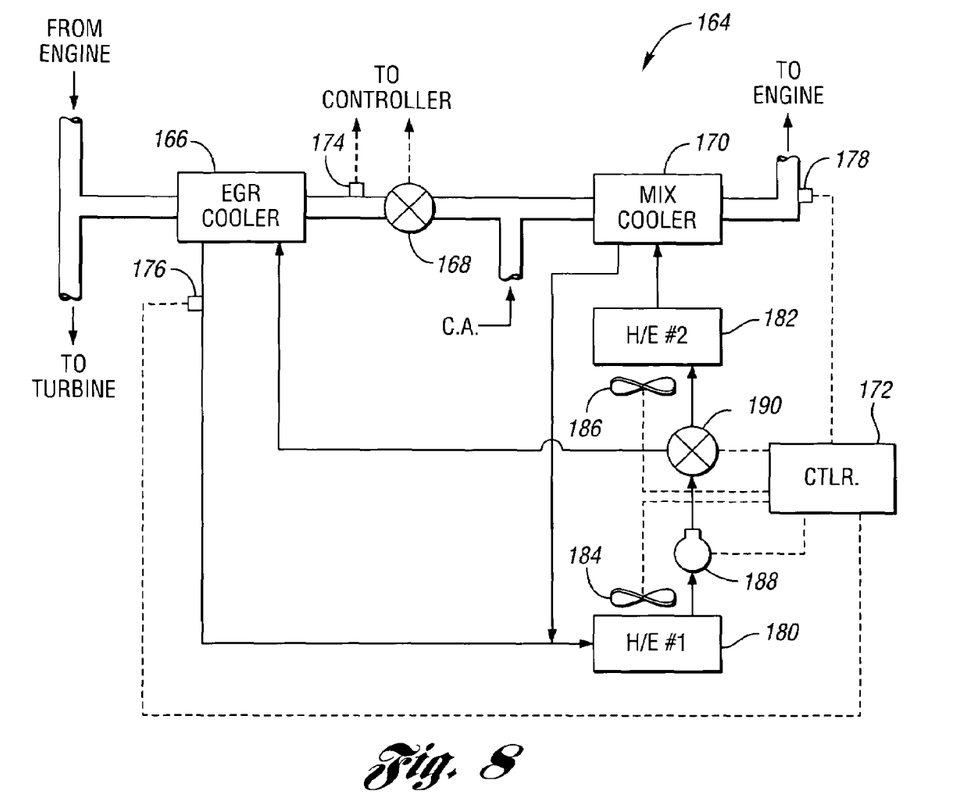
FIG. 8 is a schematic representation of a ninth vehicle thermal management system in accordance with the present invention.

FIG. 8 shows another vehicle thermal management system 164 in accordance with the present invention. The thermal management system 164 includes an EGR cooler 166, an EGR valve 168, and a mixed gas cooler 170. The EGR valve 168 is controlled by a control system, shown as controller 172. Temperature sensors 174, 176, and 178, provide inputs to the controller 172. The thermal management system 164 includes a pair of heat exchangers 180, 182, and a pair of fans 184, 186, for respectively facilitating airflow over the heat exchangers 180, 182. A pump 188, controlled by the controller 172, is used to circulate coolant through the system 164. A valve 190 allows some or all of the coolant to be directed through the heat exchanger 182 and into the mixed gas cooler 170. Alternatively, the valve 190 can direct all of the coolant through the EGR cooler 166; in such a case, the heat exchanger 182 and the mixed gas cooler 170 are bypassed. Thus, the thermal management system 164 provides a great deal of flexibility in controlling the temperature of the air entering the engine (not shown).

Figure 9:
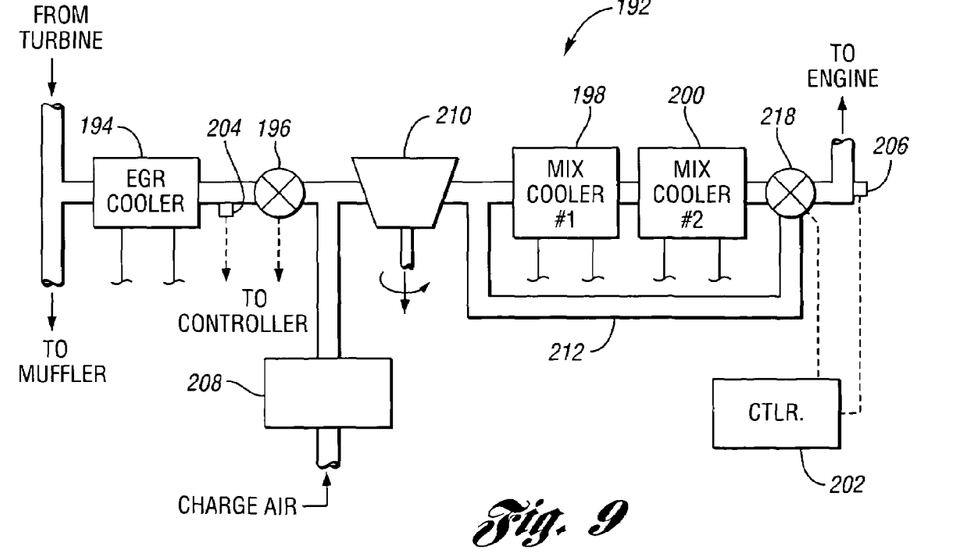
FIG. 9 is a schematic representation of a tenth vehicle thermal management system in accordance with the present invention.

FIG. 9 shows another vehicle thermal management system 192 in accordance with the present invention. In this drawing figure, the coolant lines have been omitted for clarity. It is understood, however, that any arrangement of coolant lines effective to allow adequate temperature control can be used, including any of the arrangements shown in the previous drawing figures. The thermal management system 192 includes an EGR cooler 194, which receives low pressure exhaust gas after it has passed through a turbine (not shown). Up stream from the EGR cooler 194 may also be a diesel oxidizing catalyst and/or a particulate filter trap, both of which can be effective to reduce undesirable emissions and prevent clogging of the EGR cooler 194. The thermal management system 192 also includes an EGR valve 196, a first mixed gas cooler 198, and an optional second mixed gas cooler 200. The EGR valve 196 is controlled by a control system, shown as controller 202. Temperature sensors 204, 206 provide inputs to the controller 202. A filter 208 is used to clean the charge air prior to its mixing with the exhaust gas. In addition, a compressor 210 compresses the mixed gas, rather than compressing merely the charge air. In this way, the charge air and the exhaust gas mix at a lower pressure.

After the mixed gas is compressed by the compressor 210, it can take one of two routes. Either the mixed gas can pass through the mixed gas cooler 198 (and the optional mixed gas cooler 200), or some or all of it can pass through a bypass line 212. The bypass line 212 has an inlet 214 that is upstream from the first mixed gas cooler 198, and an outlet 216 that is downstream from the first mixed gas cooler 198. A valve 218, which is controlled by the controller 202, is operable to allow some or all of the mixed gas to pass through the bypass line 212. This arrangement may be particularly beneficial in cold weather conditions, where no additional cooling is needed after the mixed gas leaves the compressor 210. In an alternative embodiment (not shown), the bypass line 212 and the valve 218 are eliminated, and the heat in the mixed gas passing through the compressor 210 is maintained by stopping the flow of coolant through the mixed gas coolers 198, 200.

Figure 10:
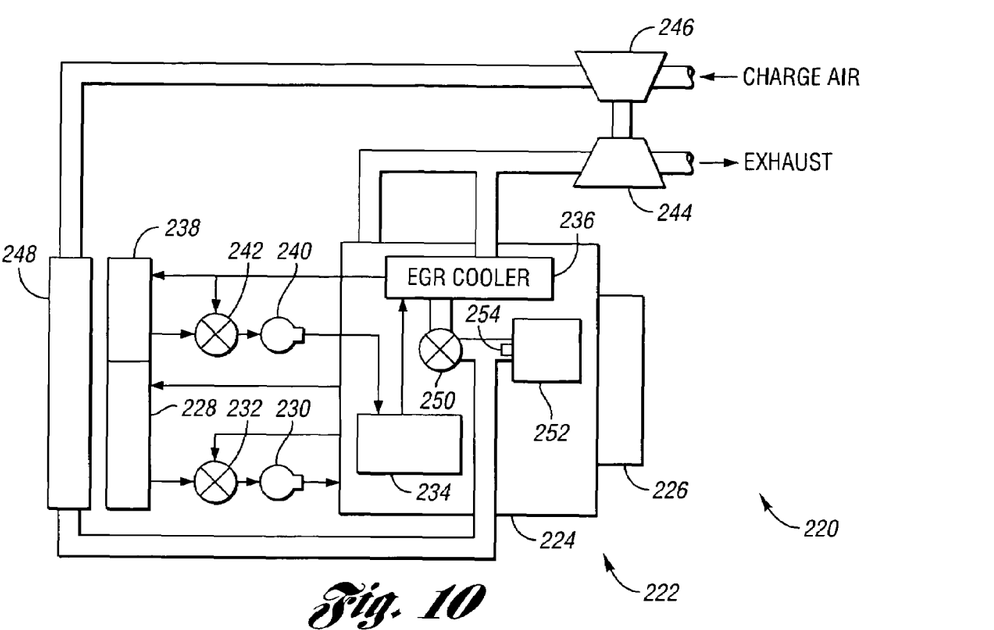
FIG. 10 is a schematic representation of an eleventh vehicle thermal management system in accordance with the present invention.

FIG. 10 shows another vehicle thermal management system 220 in accordance with the present invention. A portion of a vehicle 222 is also shown, and includes an engine 224 and a transmission 226. To cool the engine 224, a primary radiator 228 is provided. A pump 230 pumps engine coolant through the radiator 228, and a bypass valve 232 allows the coolant to bypass the radiator 228 in cold conditions. An engine oil cooler 234 is in fluid communication with an EGR cooler 236. In particular, coolant leaving the oil cooler 234 enters the EGR cooler 236. The coolant is then pumped through a heat exchanger 238 by a pump 240. Alternatively, the coolant can bypass the heat exchanger 238 via the bypass valve 242.

Some of the exhaust gas leaving the engine 224 operates a turbine 244, which in turn operates a compressor 246. The compressor 246 compresses the charge air, which is then cooled in an air-to-air charge air cooler 248. Some of the exhaust gas leaving the engine 224 is recirculated back through the EGR cooler 236. This is controlled by the EGR valve 250. The cooled charge air and the cooled exhaust gas meet at the engine intake manifold 252. A temperature sensor 254 senses the temperature of the air at the intake manifold 252, and provides the feedback necessary for the thermal management system 220 to effectively control the temperature of combustion in the engine 224. As an alternative to the single oil cooler 234, a transmission cooler and an oil cooler with a filter assembly (not shown) can be configured in series, such that coolant leaving the pump 240 is pumped through the transmission cooler, and then into the oil cooler before being pumped back into the EGR cooler 236.

Figure 11:
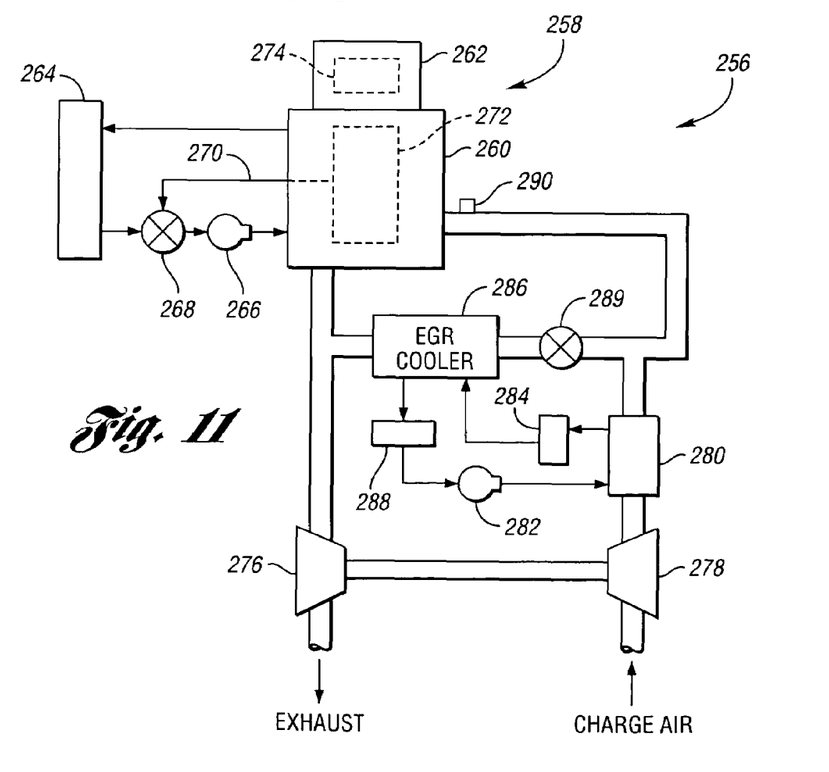
FIG. 11 is a schematic representation of a twelfth vehicle thermal management system in accordance with the present invention.

FIG. 11 shows another vehicle thermal management system 256 in accordance with the present invention. Also show in FIG. 11 is a portion of a vehicle 258, including an engine 260 and a transmission 262. A radiator 264 is used to cool engine coolant which is pumped through the engine by a pump 266. A bypass valve 268 allows some or all of the coolant to bypass the radiator 264. The bypass line 270 is directly connected to an engine oil heat exchanger 272. The engine oil heat exchanger 272 is in fluid communication with a transmission heat exchanger 274. Thus, coolant flowing through the bypass line 270 also flows through the engine oil heat exchanger 272 and the transmission heat exchanger 274.

At least some of the exhaust gas leaving the engine 260 is used to drive a turbine 276. The turbine 276, in turn, drives a compressor 278. The compressor 278 compresses the charge air, which then passes through a charge air cooler 280. The amount of heat transfer between the compressed charge air and the coolant passing through the charge air cooler 280 is controlled by the flow and the temperature of the coolant. A pump 282 is used to control the flow of the coolant through the charge air cooler 280. The coolant is then cooled by a heat exchanger 284 prior to entering an EGR cooler 286. After leaving the EGR cooler 286, the coolant passes through a second heat exchanger 288, before being pumped back through the charge air cooler 280.

That portion of the exhaust gas that is not used to drive the turbine 276, is recirculated back into the engine 260, and passes through the EGR cooler 286. The amount of exhaust gas passing through the EGR cooler 286 is controlled by an EGR valve 289. A temperature sensor 290 senses the temperature of the air entering the engine 260, and provides a signal related to the sensed temperature, so that the temperature of combustion can be appropriately controlled to ensure efficient combustion, and reduced exhaust emissions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A thermal management system for a vehicle including an engine, the system comprising:

an exhaust gas cooler configured to receive exhaust gas from the engine and to cool the exhaust gas as it passes through the exhaust gas cooler;

a first valve downstream from the exhaust gas cooler operable to control the amount of exhaust gas passing through the exhaust gas cooler;

an air intake system for receiving intake air for the engine, the intake system including a compressor operable to compress the intake air, the intake system being disposed to facilitate mixing of the intake air and the exhaust gas after the intake air is compressed and the exhaust gas has passed through the exhaust gas cooler, thereby forming a mixed gas;

a mixed gas cooler downstream from the first valve and the compressor for cooling the mixed gas as it passes through the mixed gas cooler;

a first pump operable to pump a first coolant through the mixed gas cooler, thereby facilitating heat transfer from the mixed gas to the first coolant;

a first heat exchanger in fluid communication with the mixed gas cooler for transferring heat from the first coolant to ambient air;

a radiator in fluid communication with the engine and the exhaust gas cooler;

a second pump operable to pump a second coolant through the radiator, the engine, and the exhaust gas cooler, thereby facilitating heat transfer from the engine and the exhaust gas to the second coolant, and from the second coolant to the ambient air via the radiator;

a first fan operable to move the ambient air across the first heat exchanger;

a first sensor for sensing a temperature of the mixed gas after it passes through the mixed gas cooler, and for outputting a signal related to the sensed temperature of the mixed gas;

a control system operatively connected to the sensors, the first fan and the first pump, and including at least one controller, the control system being configured to operate the first fan and the first pump to maintain the sensed temperature of the mixed gas within a first temperature range; and a second valve disposed between an outlet of the mixed gas cooler and an inlet of the exhaust gas cooler, the second valve being in communication with the control system and operable to direct at least some of the first coolant to the inlet of the exhaust gas cooler, and at least some of the first coolant to an inlet of the first heat exchanger.

2. The thermal management system of claim 1, wherein the control system is configured with a control structure for optimizing the speed of the first pump and the speed of the first fan based at least in part on the sensed temperature of the first coolant, the optimized speeds providing a maximized heat transfer between the first coolant and the ambient air via the first heat exchanger for a minimized combined power input into the first pump and the first fan, for a respective amount of heat transfer.

3. The thermal management system of claim 1, further comprising:

a flow sensor for sensing the flow of exhaust gas through the first valve, and for outputting a signal related to the sensed flow to the control system, and wherein the control system is configured with a control structure for optimizing the speed of the first pump and the speed of the first fan based at least in part on the sensed flow of the exhaust gas, the optimized speeds providing a maximized heat transfer between the first coolant and the ambient air via the first heat exchanger for a minimized power input into the first pump and the first fan, for a respective amount of heat transfer.

4. The thermal management system of claim 1, further comprising:

a second heat exchanger for providing additional heat transfer between the first coolant and the ambient air, the second heat exchanger being configured to receive the first coolant leaving the exhaust gas cooler; and a second fan in communication with the control system and operable to move the ambient air across the second heat exchanger.

5. The thermal management system of claim 4, wherein the second heat exchanger is disposed between an outlet of the exhaust gas cooler and an inlet of the first heat exchanger.

6. The thermal management system of claim 4, wherein the second heat exchanger is disposed between an outlet of the exhaust gas cooler and an inlet of the first pump.

7. A thermal management system for a vehicle including an engine, the system comprising:

an exhaust gas cooler configured to receive exhaust gas from the engine and to cool the exhaust gas as it passes through the exhaust gas cooler;

a first valve operable to control the amount of exhaust gas passing through the exhaust gas cooler;

an air intake system for receiving intake air for the engine, the intake system including a compressor operable to compress the intake air, the intake system being disposed to facilitate mixing of the intake air and the exhaust gas after the intake air is compressed and the exhaust gas has passed through the exhaust gas cooler, thereby forming a mixed gas;

a mixed gas cooler downstream from the first valve and the compressor for cooling the mixed gas as it passes through the mixed gas cooler;

a first heat exchanger in fluid communication with the mixed gas cooler for transferring heat from a coolant to ambient air;

a pump operable to pump the coolant through the mixed gas cooler and the exhaust gas cooler, thereby facilitating respective heat transfer from the mixed gas and the exhaust gas to the coolant;

a first fan operable to move the ambient air across the first heat exchanger;

a first sensor for sensing a temperature of the mixed gas after it passes through the mixed gas cooler, and for outputting a signal related to the sensed temperature of the mixed gas;

a second sensor for sensing a temperature of the coolant, and for outputting a signal related to the sensed temperature of the coolant; and a control system operatively connected to the sensors, the first fan, and the pump and including at least one controller, the control system being configured to operate the first fan and the pump to maintain the sensed temperature of the mixed gas within a first temperature range.

8. The thermal management system of claim 7, wherein the control system is configured with a control structure for optimizing the speed of the pump and the speed of the first fan based at least in part on the sensed temperature of the coolant, the optimized speeds providing a maximized heat transfer between the coolant and the ambient air via the first heat exchanger for a minimized combined power input into the pump and the first fan, for a respective amount of heat transfer.

9. The thermal management system of claim 7, further comprising a second valve disposed between the pump and an inlet of the mixed gas cooler, the second valve being in communication with the control system and operable to direct at least some of the coolant to the inlet of the mixed gas cooler, and at least some of the coolant to an inlet of the exhaust gas cooler.

10. The thermal management system of claim 7, farther comprising:

a second heat exchanger in fluid communication with the first heat exchanger and the mixed gas cooler for transferring heat from the coolant to the ambient air; and a second valve disposed between the pump and an inlet of the second heat exchanger, the second valve being in communication with the control system and operable to direct at least some of the coolant to an inlet of the second heat exchanger, and at least some of the coolant to an inlet of the exhaust gas cooler.

11. The thermal management system of claim 7, further comprising a second valve disposed between an outlet of the mixed gas cooler and an inlet of the exhaust gas cooler, the second valve being in communication with the control system and operable to direct at least some of the coolant to the inlet of the exhaust gas cooler, and at least some of the coolant to an inlet of the first heat exchanger.

12. The thermal management system of claim 11, further comprising:
   a second heat exchanger for providing additional heat transfer between the coolant and the ambient air, the second heat exchanger being configured to receive the coolant leaving the exhaust gas cooler; and
   a second fan in communication with the control system and operable to move the ambient air across the second heat exchanger.

13. The thermal management system of claim 12, wherein the second heat exchanger is disposed between an outlet of the exhaust gas cooler and an inlet of the first heat exchanger.

14. The thermal management system of claim 12, wherein the second heat exchanger is disposed between an outlet of the exhaust gas cooler and an inlet of the pump.

15. The thermal management system of claim 12, wherein the control structure includes optimized speeds for the pump and the second fan, the optimized speeds for the pump and the second fan providing a maximized heat transfer between the coolant and the ambient air via the second heat exchanger for a minimized power input into the pump and the second fan, for a respective amount of heat transfer.

16. The thermal management system of claim 7, further comprising:
   a second heat exchanger in fluid communication with the exhaust gas cooler for transferring heat from the first coolant to the ambient air; and
   a second valve disposed between the mixed gas cooler and the exhaust gas cooler, the second valve being in communication with the control system and operable to direct at least some of the first coolant to an inlet of the first heat exchanger, and at least some of the first coolant to an inlet of the exhaust gas cooler.

17. The thermal management system of claim 7, further comprising:
   a second heat exchanger in fluid communication with the exhaust gas cooler for transferring heat from the first coolant to the ambient air; and
   a second valve disposed between the mixed gas cooler and the second heat exchanger, the second valve being in communication with the control system and operable to direct at least some of the first coolant to an inlet of the first heat exchanger, and at least some of the first coolant to an inlet of the second heat exchanger.

18. A thermal management system for a vehicle including an engine, the system comprising:
   an exhaust gas cooler configured to receive exhaust gas from the engine and to cool the exhaust gas as it passes through the exhaust gas cooler;
   a first valve downstream from the exhaust gas cooler operable to control the amount of exhaust gas passing through the exhaust gas cooler;
   an air intake system for receiving intake air for the engine, the intake system including a compressor operable to compress the intake air, the intake system being disposed to facilitate mixing of the intake air and the exhaust gas after the intake air is compressed and the exhaust gas has passed through the exhaust gas cooler, thereby forming a mixed gas;
   a mixed gas cooler downstream from the first valve and the compressor for cooling the mixed gas as it passes through the mixed gas cooler;
   a first pump operable to pump a first coolant through the mixed gas cooler, thereby facilitating heat transfer from the mixed gas to the first coolant;
   a first heat exchanger in fluid communication with the mixed gas cooler for transferring heat from the first coolant to ambient air;
   a radiator in fluid communication with the engine and the exhaust gas cooler;
   a second pump operable to pump a second coolant through the radiator, the engine, and the exhaust gas cooler, thereby facilitating heat transfer from the engine and the exhaust gas to the second coolant, and from the second coolant to the ambient air via the radiator;
   a first fan operable to move the ambient air across the first heat exchanger;
   a first sensor for sensing a temperature of the mixed gas after it passes through the mixed gas cooler, and for outputting a signal related to the sensed temperature of the mixed gas;
   a control system operatively connected to the sensors, the first fan and the first pump, and including at least one controller, the control system being configured to operate the first fan and the first pump to maintain the sensed temperature of the mixed gas within a first temperature range; and
   a second valve disposed between the first pump and an inlet of the mixed gas cooler, the second valve being in communication with the control system and operable to direct at least some of the first coolant to the inlet of the mixed gas cooler, and at least some of the first coolant to an inlet of the exhaust gas cooler.

19. The thermal management system of claim 18, wherein the control system is configured with a control structure for optimizing the speed of the first pump and the speed of the first fan based at least in part on the sensed temperature of the first coolant, the optimized speeds providing a maximized heat transfer between the first coolant and the ambient air via the first heat exchanger for a minimized combined power input into the first pump and the first fan, for a respective amount of heat transfer.

20. The thermal management system of claim 18, farther comprising:
   a flow sensor for sensing the flow of exhaust gas through the first valve, and for outputting a signal related to the sensed flow to the control system, and
   wherein the control system is configured with a control structure for optimizing the speed of the first pump and the speed of the first fan based at least in part on the sensed flow of the exhaust gas, the optimized speeds providing a maximized heat transfer between the first coolant and the ambient air via the first heat exchanger for a minimized power input into the first pump and the first fan, for a respective amount of heat transfer.

* * * * *

UNITED STATES PATENT AND TRADEMARK OFFICE
CERTIFICATE OF CORRECTION

PATENT NO. : 7,454,896 B2  Page 1 of 1
APPLICATION NO. : 11/063686
DATED : November 25, 2008
INVENTOR(S) : Robert D. Chalgren et al.

It is certified that error appears in the above-identified patent and that said Letters Patent is hereby corrected as shown below:

Column 12, Line 54, Claim 10:

Delete "farther" and insert -- further --.

Column 14, Line 47, Claim 20:

Delete "farther" and insert -- further --.

Signed and Sealed this

Seventeenth Day of February, 2009

JOHN DOLL
*Acting Director of the United States Patent and Trademark Office*